Dec. 12, 1950 H. J. McCREARY 2,533,677

ELECTRONIC DEVICE FOR TIMING TOLL CALLS AND FOR SIGNALING BOTH SUBSCRIBER AND OPERATOR

Filed Sept. 15, 1945 2 Sheets-Sheet 1

INVENTOR.
HAROLD J. MC CREARY

BY Chas. L. Candy

ATTORNEY

INVENTOR.
HAROLD J. MC CREARY
BY
Chas. Tu. Candy
ATTORNEY

Patented Dec. 12, 1950

2,533,677

UNITED STATES PATENT OFFICE 2,533,677

ELECTRONIC DEVICE FOR TIMING TOLL CALLS AND FOR SIGNALING BOTH SUBSCRIBER AND OPERATOR

Harold J. McCreary, Lombard, Ill., assignor to Automatic Electric Laboratories, Inc., Chicago, Ill., a corporation of Delaware Application September 15, 1945, Serial No. 616,615

4 Claims. (Cl. 179—7.1)

The present invention relates in general to telephone systems and, in particular, to improved circuit arrangements for timing toll calls therein.

In dial switching telephone systems it is the customary practice to permit subscribers to complete connections within a local calling area while calls to other areas requiring a toll charge are completed by an intervening operator. Ordinarily a naught is dialled by the calling party to secure the assistance of an "A" operator when making a toll call. In response to the extension of a connection to a trunk terminating at the "A" switchboard, an operator at that switchboard answers the call by plugging one of her cord circuits into the trunk jack. The operator then makes out a toll ticket and proceeds to establish the desired connection by inserting the calling end of the cord circuit into a jack terminating an outgoing trunk to the desired distant office, and either passing the desired number to an incoming operator thereat or dialling the digits of the desired number. When the called subscriber answers, assuming that the desired connection is successfully completed, the operator notes the time that the conversation starts on the toll ticket. Upon receiving a disconnect signal at the termination of the conversation, the operator again notes the time on the toll ticket. Usually a charge is made for the initial period of the conversation, which may vary from three to five minutes, and an overtime charge is made for each subsequent period, which subsequent periods are usually shorter than the initial period. Oftentimes an operator is requested by a subscriber to interrupt the conversation when the total charge has reached a predetermined amount. Such special service reduces the efficiency of the operator considerably.

It is accordingly an object of the present invention to provide improved timing means for informing both the calling party and the operator of the expiration of the initial time period and each subsequent period of a toll call so that the calling party may terminate the conversation when a predetermined total charge has been reached, and so that the operator's time may be more gainfully employed by reducing the amount of time spent in supervising each call.

A further object of the invention is to provide an improved timing apparatus for conversation timing of toll calls which is readily adjusted to different desired durations of the initial and overtime periods and which requires little or no maintenance.

For a complete understanding of the invention, reference may be had to the following description taken in conjunction with the accompanying drawings, in which.

Figure 1:
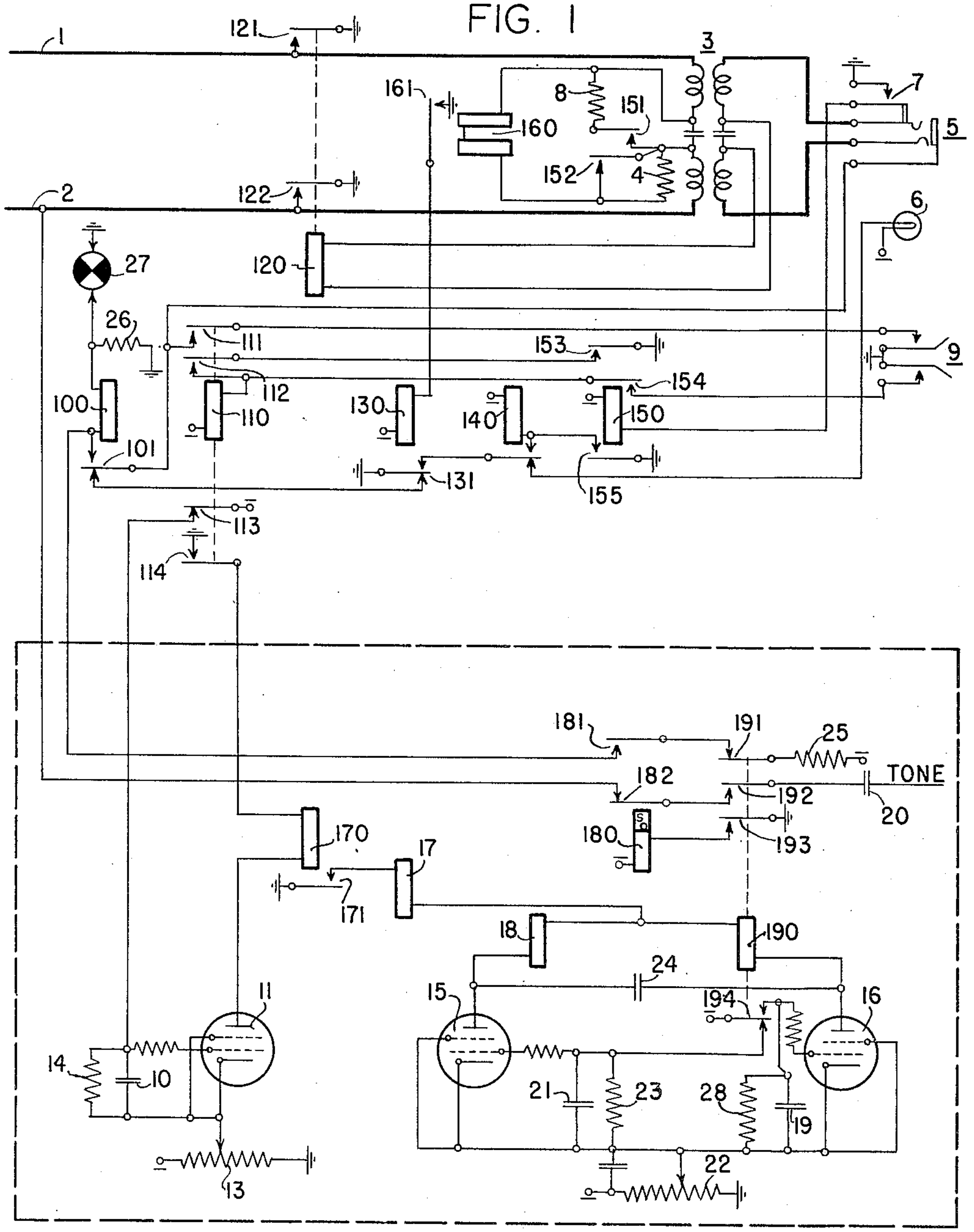
Fig. 1 illustrates, in the form of a schematic diagram, a trunk circuit terminating a trunk to a toll switchboard, which trunk circuit incorporates a novel conversation timing apparatus.

Briefly described, the invention comprises an electronic timer which is associated with an incoming trunk terminating in an "A" switchboard. The operation of the timer is initiated by the momentary operation of a key by the operator when a connection has been completed over the associated trunk and the called party has responded. In one form of the timer, three gaseous discharge tubes are employed. Each of these tubes has an aperiodic circuit, comprising a condenser and resistor in multiple, associated therewith. A source of anode potential, which may be the usual exchange battery, is provided but is normally disconnected from the tubes. In response to the momentary operation of the key by the operator, the anode circuit of a first one of the tubes is completed simultaneously with the opening of a charging circuit for the condenser associated therewith, which condenser is connected between the control electrode and cathode of the first tube. The charge on this condenser is such as to prevent firing of the first tube until the condenser has discharged to a predetermined potential. The time required for the discharge of the condenser is determined by the value of the resistor connected in multiple with the condenser, by the capacity thereof, and by the initial charge impressed thereon. Thus after a predetermined time interval, which is somewhat less than the desired initial time period, the first tube fires and operates a relay connected in its anode circuit to connect the source of anode potential to the second and third gas tubes. Each of the second and third tubes has a similar aperiodic circuit connected thereto, either one of which may be connected in a charging circuit by a relay connected in the anode circuit of the third tube. The aperiodic circuit associated with the second tube is normally connected in the charging circuit, while that associated with the third tube is normally disconnected from the charging circuit. Thus the third tube fires immediately in response to the operation of the relay connected in the anode circuit of the first tube. The relay in the anode circuit of the third tube operates to transfer the charging circuit from the aperiodic circuit associated with the second tube to that associated with the third tube. In response to the operation of this relay a momentary tone is applied to the trunk to inform the subscribers connected thereto that the initial time period is about to expire. After a predetermined time interval, equal to the difference between the desired initial time period and that which elapsed prior to the application of the warning tone to the trunk, the second tube fires. The anode circuits of the second and third tubes are coupled so as to cause either tube to be extinguished in response to the firing of the other tube. The third tube therefor is deionized and the relay connected thereto released, which causes a supervisory lamp in the operator's cord circuit to flash indicating the expiration of the initial time period. This lamp continues to flash until extinguished by a further momentary operation of the key used to initiate the operation of the timer. The timing apparatus continues to operate in the above manner to periodically transmit a warning tone over the trunk prior to the expiration of each overtime period, and to flash the cord supervisory lamp upon the expiration of each overtime period. The timer may be released by momentarily removing the answer plug of the cord from its jack. In the modified form of the timing apparatus the second tube is eliminated by switching arrangements which permit the first tube to perform dual functions.

Figure 3:
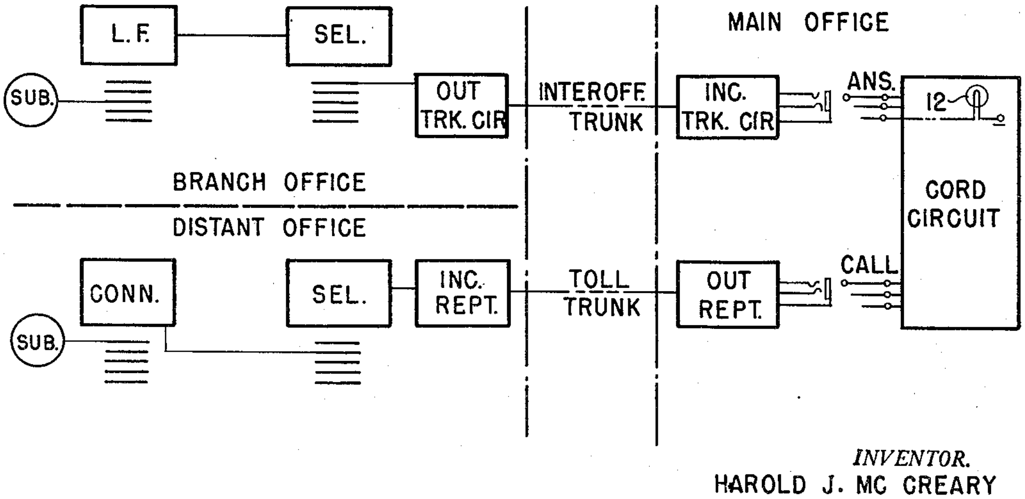
Fig. 3 is a trunking diagram illustrating the use of the trunk circuit in a complete switching system.

The operation will now be described in greater detail with reference to the drawings. Fig. 3 illustrates a typical switch train over which toll calls may be completed. In response to the initiation of a call by a subscriber in a branch office, a line finder associates a first selector with the subscriber's line in the well known manner. The subscriber then dials an "0" causing the first selector to extend the subscriber's line to an outgoing trunk circuit which seizes an incoming trunk circuit in the main office over an inter-office trunk. The incoming trunk circuit, shown in detail in Fig. 1, is seized by the extension of battery and ground thereto over conductors 1 and 2 through relays in the outgoing trunk circuit located in the branch office. Polarized relay 160 is energized over conductors 1 and 2 in series with the left windings of repeating coil 3 and resistor 4 causing relay 160 to operate and close a circuit to relay 130 at contacts 161. Relay 130 operates and at contacts 131 removes ground from the sleeve of jack 5 and closes a circuit to the trunk answer lamp 6. The operator, upon observing the lighted answer lamp, will insert the answer plug of an idle cord circuit into jack 5 thereby causing contacts 7 to close a circuit to relay 150. Relay 150 operates, connects resistor 8 in multiple with relay 160 at contacts 151, short-circuits resistor 4 at contacts 152, prepares a circuit to relay 110 at contacts 154, and closes a circuit to relay 140 at contacts 155. The decrease in resistance in the circuit bridging conductors 1 and 2 brings about the operation of a marginal relay in the outgoing trunk circuit at the other end of the inter-office trunk which causes a momentary splash of tone to be transmitted over the trunk to the operator in case the calling party has restricted service.

The operator proceeds to make out a toll ticket and to extend the connection, after having learned the number of the party with whom the calling subscriber wishes to be connected, over a toll trunk and switch train in the desired distant office. After the connection has been completed and the called party has answered, the operator momentarily operates key 9 thereby completing a circuit to relay 110 through contacts 154. Relay 110 operates, closes a circuit from ground through the upper contacts of key 9 and through contacts 111 to the sleeve of jack 5, closes its locking circuit to ground through contacts 153 at contacts 112, removes negative battery from the upper terminal of condenser 10 at contacts 113, and closes ground, or positive battery, to the anode of tube 11 through relay 170 at contacts 114. The ground placed on the sleeve of jack 5 lights the cord supervisory lamp 12 (Fig. 3) to verify to the operator that the timer has started. The circuit to lamp 12 is opened when key 9 is released.

Condenser 10 is normally charged to a potential equal to the voltage drop across the left portion of potentiometer 13. When negative battery is disconnected from the upper terminal of condenser 10 it discharges through resistor 14. When condenser 10 has discharged to the striking potential of tube 11, it becomes ionized thereby energizing relay 170. Relay 170 operates and at contacts 171 closes ground through impedances 17 and 18 to the anode of tube 15, and through impedance 17 and relay 190 to the anode of tube 16. The control electrode of tube 15 is normally connected to negative battery at contacts 194 which prevents tube 15 from striking. The condenser 19 connected between the control electrode and cathode of tube 16 is normally discharged, therefore tube 16 strikes immediately and energizes relay 190. Relay 190 operates, connects a source of tone, not shown, through condenser 20, and contacts 192 and 182 to conductor 2, closes a circuit to slow acting relay 180 at contacts 193, and transfers negative battery from condenser 21 to condenser 19 at contacts 194. Tube 16 remains ionized, however, since the control electrode loses control of the tube once it has become ionized. Relay 180 operates after a brief delay and disconnects the tone source from conductor 2 at contacts 182. The momentary splash of tone placed on the trunk serves to warn the calling and called parties that the initial charge period is about to expire.

Condenser 21 is normally charged to a potential equal to the voltage drop across the left portion of potentiometer 22. When negative battery is removed from the upper terminal of this condenser by the operation of relay 190, condenser 21 commences to discharge through resistor 23. After a predetermined time interval condenser 21 is discharged to the striking potential of tube 15. When tube 15 fires it causes tube 16 to be deionized by momentarily lowering the anode voltage thereof. This momentary reduction in the anode potential of one tube in response to the firing of the alternate tube is accomplished by the capacitive coupling between the two anodes through condenser 24. Relay 190 restores when tube 16 is deionized, closes a circuit from negative battery through resistor 25, contacts 191 and 181, relay 100, and high resistance 26 to ground, opens the circuit to relay 180 at contacts 193, and transfers negative battery from condenser 19 back to condenser 21 at contacts 194. Relay 100 operates and locks to battery through the cord supervisory lamp 12 and the sleeve conductor of the cord at contacts 101. Relay 180 restores after a brief delay and opens the operating circuit to relay 100 at contacts 181. Relay 100 holds in series with lamp 12 and high resistance 26, but the current flowing in this circuit is insufficient to light lamp 12. The high resistance 26 is periodically short-circuited by an interrupter 27 thereby causing lamp 12 to flash on and off. The flashing of lamp 12 notifies the operator of the termination of the initial charge period. A flashing lamp signal is used to differentiate from a disconnect signal, which is given by a steady lighting of the same lamp when the calling party disconnects. Upon observing the flashing of lamp 12, the operator again momentarily operates key 9. The upper contacts of key 9 short-circuit relay 100 through contacts 111 and 101. Relay 100 consequently restores. When key 9 is released ground is removed from the sleeve of jack 5 and lamp 12 is extinguished.

During the time that relay 190 was operated it connected negative battery to the upper terminal of condenser 19 causing this condenser to become charged to a potential equal to the voltage drop across the left portion of potentiometer 22. When relay 190 restored at the expiration of the initial charge period it removed negative battery from the upper terminal of condenser 19 which then discharges through resistor 28. After a predetermined time interval, which is somewhat less than the desired overtime period, condenser 19 is discharged to the striking potential of tube 16. Tube 16 fires, deionizes tube 15 by momentarily lowering its plate potential, and operates relay 190. Relays 190 and 180 operate as previously described to impress a splash of tone on the trunk and to initiate the timing of a further brief time interval by condenser 21 and resistor 23. At the end of this further brief time interval tube 15 is fired to deionize tube 16 and thus release relays 180 and 190. Relay 100 is again operated to flash the cord supervisory lamp, upon the release of relay 190, to indicate the expiration of the first overtime charge period. This same cycle of events will be repeated indefinitely until the timer is released by the operator.

For a given initial charge, the sum of the time constants of the aperiodic circuits associated with tubes 15 and 16 determines the duration of the overtime period and the ratio between the time constants of these circuits determines the amount by which the warning tone precedes the expiration of the time period. If desired, resistors 23 and 28 may be made adjustable to permit independent adjustment of the two portions of each overtime period. The adjustment of potentiometer 22 determines the initial charge on condensers 19 and 21 and thus may be used to vary the duration of the overtime period. Similarly, potentiometer 13 determines the initial charge on condenser 10 and may be varied to change the duration of the initial charge period. The time constants of these aperiodic circuits, and the adjustment of potentiometers 13 and 22, may, for example, be such that tube 11 fires 1¾ minutes after relay 110 operates, tube 15 fires 15 seconds after relay 190 operates, and tube 16 fires 45 seconds after relay 190 restores. The initial charge period will then be three minutes and subsequent overtime periods will be one minute. The warning tone will then be given 15 seconds before the expiration of the initial charge period and each subsequent overtime period.

Assuming, for example, that the time constants of the aperiodic circuits of tubes 11, 15 and 16 (Fig. 1) and the adjustments of their respective resistors and capacitors are such that tube 11 fires two and three-fourths minutes after relay 110 operates, tube 15 fires 15 seconds after relay 190 operates, and tube 16 fires 45 seconds after relay 190 restores. Thus it will be noted that the initial charge period will total three minutes and each subsequent overtime period will total one minute. The resistor and condenser values of each aperiodic circuit can be computed by the formula $$T=RC\log.\frac{E1}{E2}$$

where
T=time in seconds
R=resistance in megohms
C=capacity in microfarads
Log.=natural logarithm to base $e$
E1=initial charge-voltage of C
E2=grid to cathode voltage when tube fires Tubes 11, 15, and 16 may be of the 2050 type thyratron tubes that fire when their grid to cathode voltage drops to 1 volt. The resistor condenser values of these tube circuits are determined as follows:

*Tube 11*

Assume that the battery voltage is 48 volts, potentiometer 13 may be 500 ohms and tapped at 10 volts from the negative end, relay 170 may have a 1000 ohm coil, the non-designated grid resistor may be 10,000 ohms and the time delay desired is two and three-fourths minutes or 165 seconds. From the above-given formula, the values of resistor 14 and condenser 10 are determined as follows:

$$T=165=RC\log.\frac{E1}{E2}=\frac{10}{1}$$

$$165=RC\log.\frac{10}{1}=2.3$$

$$RC=\frac{165}{2.3}=71.74+\text{ or }71.8$$

Condenser 10 can be 10 microfarads and resistor 14 will then be 7.18 megohms.

*Tube 15*

Assume that the battery voltage is 48 volts, potentiometer 22 may be 500 ohms and tapped at 10 volts from the negative end, impedances 17 and 18 each may have 200 ohm coils, relay 190 may have a 200 ohm coil, the non-designated condenser on potentiometer 22 may have a value of 10 microfarads, condenser 24 may have a value of .75 microfarad, the non-designated grid resistor may be 10,000 ohms and the time delay desired is 15 seconds. From the above-given formula, the values of resistor 23 and condenser 21 are determined as follows:

$$T=15=RC\log.\frac{E1}{E2}=\frac{10}{1}$$

$$15=RC\log.\frac{10}{1}=2.3$$

$$RC=\frac{15}{2.3}=6.52+$$

Condenser 21 can be 1 microfarad and resistor 23 will then be 6.52 megohms.

*Tube 16*

Assume that the same values are used for tube 16 as were used for tube 15 with the exception that the time delay desired is 45 seconds. From the above-given formula, the values of resistance 28 and condenser 19 are determined as follows:

$$T=45=RC\ \log.\frac{E1}{E2}=\frac{10}{1}$$

$$45=RC\ \log.\frac{10}{1}=2.3$$

$$RC=\frac{45}{2.3}=19.56+\text{ or }19.6$$

Condenser 19 can be 2 microfarads and resistor 28 will then be 9.8 megohms.

Figure 2:
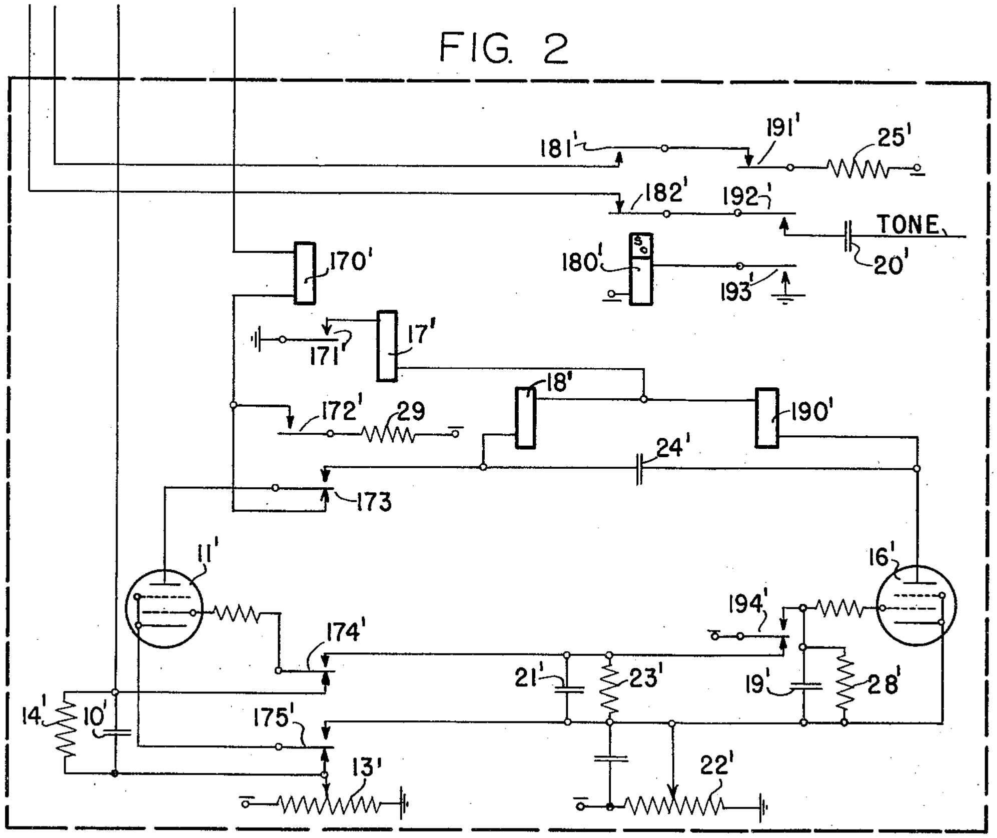
Fig. 2 shows a modification of the timing apparatus included in Fig. 1.

The same formula may be applied to determine the values of the resistors and condensers in the tube circuits of tubes 11' and 16' of Figure 2.

If at any time the operator wishes to release the timer, she may do so simply by momentarily removing the answer plug from jack 7 to thereby release relay 150 which opens the locking circuit to relay 110 at contacts 153. When the answer plug is reinserted in jack 5 relay 150 reoperates but relay 110 will remain normal. The restoration of relay 110 opens the circuit to relay 170 which restores and opens the circuit to relay 190.

When the calling party disconnects, the direction of current flow over conductors 1 and 2 of the inter-office trunk is reversed. Polarized relay 160 consequently restores and opens the circuit to relay 130 at contacts 161. Relay 130 restores and grounds the sleeve of jack 5 at contacts 131 through contacts 101 to light the cord supervisory lamp 12 continuously. If at this time the operator wishes to recall the calling party, she may operate a ringing key in the cord circuit to energize relay 120 in series with the right windings of repeating coil 3 over the tip and ring conductors of the cord. When relay 120 operates it grounds conductors 1 and 2 at contacts 121 and 122 to operate a differential relay in the outgoing trunk circuit, which latter relay transmits ringing current over the calling party's line.

When the operator removes the answer plug from jack 5 to terminate the connection, the circuit to relay 150 is opened at contacts 7. Relay 150 restores, opens the circuit to relay 140 at contacts 155, and opens the locking circuit to relay 110 at contacts 153. Relay 140 restores. Relay 110 restores and removes ground from the anode of tube 11 thus releasing relay 170 which in turn removes ground from the anodes of tubes 15 and 16. Relays 190 and 180 restore in turn, if operated.

The modification of the timer shown in Fig. 2 may be substituted for that shown within the dotted lines in Fig. 1. Corresponding reference characters are used in Fig. 2 with primes affixed. In this modification tube 15 of Fig. 1 has been eliminated by employing additional contacts on relay 170, which contacts rearrange the connections of tube 11 so as to enable it to perform the function of tube 15 in addition to its original function. Thus with relay 170' at normal, tube 11' is connected identically to tube 11 of Fig. 1 through contacts 173', 174' and 175'. When tube 11' fires it energizes relay 170' which operates, closes a locking circuit to itself through resistance 29 at its preliminary make contacts 172', transfers the anode of tube 11' from relay 170' to impedance 18' at contacts 173', transfers the control electrode of tube 11' from condenser 10' to condenser 21' at contacts 174', and transfers the cathode of tube 11' from potentiometer 13' to potentiometer 22' at contacts 175'. During the movement of the armatures of contacts 173' and 175' from their break to their make contacts the anode circuit of tube 11' is opened, which causes it to become deionized. Tube 11' is now connected identically to tube 15 in Fig. 1 and functions in like manner.

While a particular embodiment of the invention has been illustrated, it should be understood that numerous modifications may be made therein without departing from the true spirit and scope of the invention as defined in the subjoined claims.

What is claimed is:

1. A timing arrangement for measuring elapsed time of telephone conversations over a trunk circuit, a hot-cathode gaseous filled electron discharge device, a biasing circuit for controlling said discharge device, an aperiodic circuit included in said biasing circuit and comprising a condenser and a resistor connected in multiple, a source of current and a circuit for charging said condenser to a given potential for biasing said discharge device, means for initiating the flow of an aperiodic current in said aperiodic circuit when it is desired to start the timing of an established connection over said trunk circuit by opening said charging circuit to slowly discharge said condenser through said resistor at a given rate to reduce the potential in said biasing circuit, a warning tone circuit, said discharge device operative in response to said reduced potential in said biasing circuit reaching a certain predetermined value, and means controlled responsive to the operation of said discharge device for completing said warning tone circuit to warn subscribers in said connection of the impending expiration of an initial charge period.

2. A timing arrangement for measuring elapsed time of telephone conversations over a trunk circuit, a pair of hot-cathode gaseous filled electron discharge devices, a pair of biasing circuits for controlling each of said discharge devices, an aperiodic circuit included in each of said biasing circuits and each comprising a condenser and a resistor connected in multiple, a source of current and an individual circuit for charging each of said condensers to a given potential for biasing each respective discharge device, means for initiating the flow of an aperiodic current in one of said aperiodic circuits when it is desired to start the timing of an established connection over said trunk circuit by opening said charging circuit individual to said one aperiodic circuit to slowly discharge the corresponding condenser through its said resistor at a given rate to reduce the potential in the corresponding biasing circuit, a warning tone circuit, said one discharge device operative in response to said reduced potential in its individual biasing circuit reaching a certain predetermined value, means controlled responsive to the operation of said one discharge device for completing said warning tone circuit to warn subscribers in said connection of the impending expiration of an initial charge period and for initiating the flow of an aperiodic current in the other of said aperiodic circuits by opening said charging circuit individual to said other aperiodic circuit to slowly discharge the corresponding condenser through its said resistor at a given rate to reduce the potential in the corresponding biasing circuit, a signalling circuit, said other discharge device operative in response to said reduced potential in its individual biasing circuit reaching a certain predetermined value, and means controlled responsive to the operation of said other discharge device for completing said signalling circuit to indicate the expiration of the initial charge period.

3. A timing arrangement for measuring elapsed time of telephone conversations over a trunk circuit; a first, a second and a third hot-cathode gaseous filled electron discharge device; a first, a second and a third biasing circuit for respectively controlling each of said discharge devices; an aperiodic circuit included in each of said biasing circuits and each comprising a condenser and a resistor connected in multiple, a source of current and an individual circuit for charging each of said condensers to a given potential for biasing each respective discharge device, means for initiating the flow of a first aperiodic current in the aperiodic circuit corresponding to said first biasing circuit when it is desired to start the timing of an established connection over said trunk circuit by opening said charging circuit individual to said aperiodic circuit to slowly discharge the corresponding condenser through its said resistor at a given rate to reduce the potential in said first biasing circuit, said first discharge device operative in response to said reduced potential in said first biasing circuit reaching a certain predetermined value, means controlled responsive to the operation of said first discharge device for initiating the flow of a second aperiodic current in the aperiodic circuit corresponding to said second biasing circuit by opening said charging circuit individual to said second aperiodic circuit to slowly discharge the corresponding condenser through its said resistor at a given rate to reduce the potential in said second biasing circuit, said second discharge device operative in response to said reduced potential in said second biasing circuit reaching a certain predetermined value, a warning tone circuit, a relay operated responsive to said operation of said second discharge device for completing said warning tone circuit to warn subscribers in said connection of the impending expiration of an initial charge period and for initiating the flow of a third aperiodic current in the aperiodic circuit corresponding to said third biasing circuit by opening said charging circuit individual to said aperiodic circuit to slowly discharge the corresponding condenser through its said resistor at a given rate to reduce the potential in said third biasing circuit, said third discharge device operative in response to said reduced potential in said third biasing circuit reaching a certain predetermined value, means controlled responsive to the operation of said third discharge device to cause the release of said relay, and a signalling circuit completed in response to the release of said relay to indicate the expiration of the initial charge period.

4. A timing arrangement such as claimed in claim 3, including contacts on said relay controlled responsive to said release of said relay for again initiating the flow of said second aperiodic current.

HAROLD J. McCREARY.

REFERENCES CITED

The following references are of record in the file of this patent:

UNITED STATES PATENTS

| Number | Name | Date |
|---|---|---|
| 1,670,303 | Gohorel | May 22, 1928 |
| 1,719,474 | Jutson | July 2, 1929 |
| 1,726,982 | Friendly | Sept. 3, 1929 |
| 1,825,723 | Friend et al. | Oct. 6, 1931 |
| 1,917,884 | Hague | July 11, 1933 |
| 1,953,474 | Fowler | Apr. 3, 1934 |
| 2,338,218 | Vroom | June 4, 1944 |
| 2,362,425 | Wiese | Nov. 7, 1944 |
| 2,400,085 | Gent | May 14, 1946 |